Dec. 21, 1926.

N. M. JOHNSON 1,611,452

LUBRICATING MACHINE

Filed May 28, 1924

INVENTOR.
BY Noble Mearle Johnson
Gerald S. Baldwin
ATTORNEY.

Patented Dec. 21, 1926.

1,611,452

UNITED STATES PATENT OFFICE.

NOBLE MEARLE JOHNSON, OF DETROIT, MICHIGAN.

LUBRICATING MACHINE.

Application filed May 28, 1924. Serial No. 716,309.

My invention relates to improvements in lubricating machines, and is primarily intended for filling grease cups of an automobile.

The object of my invention is, among other things, to so construct a machine that grease will be forced from two opposite containers through a plurality of hose into connector valves attached to the upper open ends of grease cups, so that cars can be greased in a minimum of time.

The full object of my invention and method in which it is accomplished is more completely disclosed in the following specification in which reference is made to the accompanying drawings in which—

Figure 1:
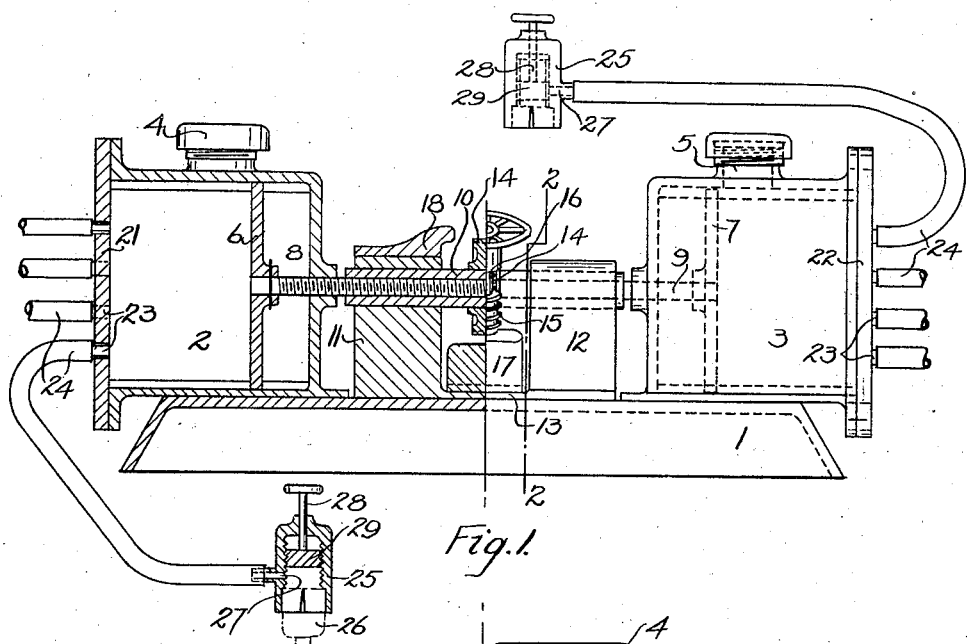
Figure 1 shows a side view of my machine partly in section and partly in elevation.
Figure 2:
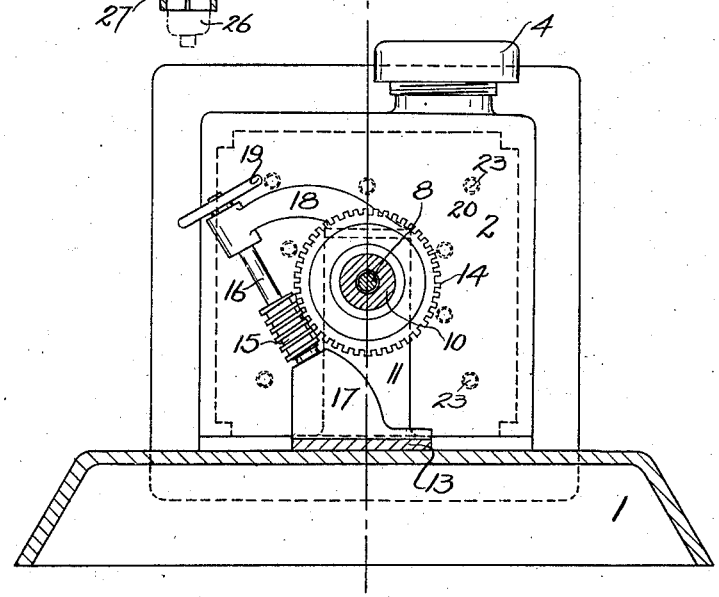
Figure 2 is a section on the line 2—2 of Figure 1.

On the base 1 I arrange two containers 2 and 3 in line with each other and each provided with filler connections as indicated at 4 and 5. In the containers 2 and 3, which are shown of rectangular section though any desired shape may be used, I supply plungers 6 and 7 to which are attached right and left hand screws 8 and 9. These latter screw from opposite ends into the bushing 10, provided through half its length with an internal right hand thread and throughout the other half of its length with an internal left hand thread. The said bushing is supported in bearings 11 and 12 preferably connected across their bases by the support 13. Around the bushing 10 and substantially midway of its length I arrange a worm wheel 14. The said worm wheel is actuated by means of a worm 15 mounted on a shaft 16 supported in bearings 17 and 18 and provided at its upper end with a handwheel 19. The bearing 17 rests on the support 13, and the bearing 18 rests on the upper face 20 of the bearing 11.

On the outer ends of my containers 2 and 3 I secure plates 21 and 22 supplied with ordinary hose connections 23, on which latter I attach a plurality of hose 24. At the ends of each hose connector valves 25 are arranged which fit over the open upper ends of the grease cups 26.

The method of operation of my invention is as follows:

As the handwheel 19 is turned, the worm wheel 14 is rotated by means of a worm 15; this in turn revolves the threaded bushing 10 so that both plungers 6 and 7 are either forced outwards towards the plates 21 and 22, or else drawn inwards from the said plates. As the plungers 6 and 7 are forced outwards grease in the containers 2 and 3 is forced simultaneously through all the hose 24. Briefly the function of the connector valves is as follows: When the spindle 28 is raised grease is admitted through the inlet 27 and may subsequently be forced into the grease cup 26 by screwing down the spindle 28. If the connector valve is not attached to a grease cup the spindle 28 is screwed down so that the side of the valve 29 closes the inlet 27 and no grease is allowed to pass through.

While I have illustrated and described a preferred embodiment of my invention, it will be understood that I do not limit myself to the specific embodiment shown, but that I may alter the construction provided the said alterations fall within the scope of what I claim.

What I claim is:

1. A lubricating machine comprising two containers arranged end to end substantially in line one with the other, a plunger in each container having a spindle attached thereto, means for forcing said spindles outwards simultaneously, and discharge openings in the walls of said containers opposite the walls through which said spindles enter.

2. A lubricating machine comprising two containers, a plunger in each container mounted on a spindle, a bushing having right hand thread for substantially half its length and left hand thread for the other half its length, each of said spindles being in threaded engagement with one end of said bushing, means for rotating said bushing, means for preventing said spindles from rotating, and discharge openings in said containers, 3. A lubricating machine comprising two containers, mounted on a base, a plunger in each of said containers, a threaded spindle attached to each of said plungers, one of said spindles provided with right hand thread and one of said spindles with a left hand thread, a bushing threaded internally to receive said threaded spindles, bearings to support said bushing, and means for rotating said bushing, in combination with a plurality of hose arranged exteriorly on the walls of said containers opposite the walls through which said spindles enter.

In testimony whereof I affix my signature at Majestic Building, Detroit, Michigan.

NOBLE MEARLE JOHNSON.